(12) United States Patent
Umemoto

(10) Patent No.: US 6,950,155 B2
(45) Date of Patent: Sep. 27, 2005

(54) LIQUID-CRYSTAL DISPLAY DEVICE

(75) Inventor: Seiji Umemoto, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 527 days.

(21) Appl. No.: 09/878,268

(22) Filed: Jun. 12, 2001

(65) Prior Publication Data

US 2002/0039155 A1 Apr. 4, 2002

(30) Foreign Application Priority Data

Jun. 14, 2000 (JP) ..................................... P. 2000-178033

(51) Int. Cl.⁷ ..................... G02F 1/1333; G02F 1/1335; F21V 7/04
(52) U.S. Cl. ........................ 349/61; 349/138; 349/139; 362/31; 362/32
(58) Field of Search ............................ 349/65, 61, 138, 349/158; 362/31, 32

(56) References Cited

U.S. PATENT DOCUMENTS

| | | | |
|---|---|---|---|
| 5,359,691 A | | 10/1994 | Tai et al. |
| 5,390,276 A | | 2/1995 | Tai et al. |
| 6,147,725 A | * | 11/2000 | Yuuki et al. ................... 349/65 |
| 6,151,087 A | | 11/2000 | Prigent ......................... 349/65 |
| 6,340,999 B1 | * | 1/2002 | Masuda et al. ............... 349/63 |
| 6,426,787 B1 | * | 7/2002 | Satake et al. ............... 349/138 |

FOREIGN PATENT DOCUMENTS

| | | | |
|---|---|---|---|
| EP | 0884620 A2 | 12/1998 | |
| GB | 2331615 A | 5/1999 | |
| JP | 5-158033 | 6/1993 | ......... G02F/1/1335 |
| WO | WO 00/19145 A1 | 4/2000 | |

OTHER PUBLICATIONS

"Prism Bulb for Fluorescent Lamp", IBM Technical Disclosure Bulletin, IBM Corp, New York, US, vol. 39, No. 4, Apr. 1, 1996.

* cited by examiner

Primary Examiner—Tarifur R. Chowdhory
Assistant Examiner—Hoan C. Nguyen
(74) Attorney, Agent, or Firm—Sughrue Mion, PLLC

(57) ABSTRACT

A liquid-crystal display device has a transmission type liquid-crystal display panel including a liquid-crystal cell, the liquid-crystal cell having a back-side substrate, a visual-side substrate, and a liquid crystal, the back-side substrate having a transparent substrate, a transparent layer lower in refractive index than the transparent substrate, and a transparent electrode, the visual-side substrate having a transparent substrate, and a transparent electrode. The liquid crystal is held between the back-side and visual-side substrates so that respective electrode sides of the back-side and visual-side substrates are disposed opposite to each other, at least one light sources is disposed on one of side surfaces of the transmission type liquid-crystal display panel, and an optical path control layer has a repetitive structure of optical path changing slopes on an outer side of the back-side substrate and is higher in refractive index than the low-refractive-index transparent layer, and each of the optical path changing slopes is inclined at an inclination angle in a range of from 35 to 48 degrees with respect to a reference plane of the back-side substrate.

22 Claims, 3 Drawing Sheets

LIQUID-CRYSTAL DISPLAY DEVICE

BACKGROUND OF THE INVENTION

1. Field of the Invention

The present invention relates to a transmission type or transmission-reflection double type liquid-crystal display device which can be easily reduced both in thickness and in weight and which is excellent in display quality.

The present application is based on Japanese Patent Application No. 2000-178033, which is incorporated herein by reference.

2. Description of the Related Art

Greater reduction in thickness, size and weight of transmission type liquid-crystal display devices has been demanded for the purposes of suppressing increase in weight which is accompanied by increase in size of television and personal computer display screens, reducing in size and weight of portable personal computers and portable telephone sets, etc. In the meanwhile, it is however difficult to reduce thickness, size and weight of a transmission type liquid-crystal display device if the display device is provided with a back-lighting system using a background-art bottom type or side-lighting type light pipe. Incidentally, the bottom type back-lighting system generally has a thickness of not smaller than 4 mm because a light source, a light diffusing plate and a reflection plate are disposed just under a liquid-crystal display panel. Even the side-lighting type light pipe has a thickness of not smaller than 1 mm under the necessity of light transmission. When a light diffusing plate, a reflection plate, a prism sheet, etc. are disposed on the side-lighting type light pipe, the total thickness generally reaches a value of not smaller than 3 mm.

SUMMARY OF THE INVENTION

An object of the present invention is to develop a transmission type or transmission-reflection double type liquid-crystal display device which can be easily reduced both in thickness and in weight and which is excellent in display quality.

According to the present invention, there is provided a liquid-crystal display device comprising: a transmission type liquid-crystal display panel including a liquid-crystal cell, the liquid-crystal cell having a back-side substrate, a visual-side substrate, and a liquid crystal, the back-side substrate having a transparent substrate, a transparent layer lower in refractive index than the transparent substrate, and a transparent electrode, the visual-side substrate having a transparent substrate, and a transparent electrode, the liquid crystal being held between the back-side and visual-side substrates so that respective electrode sides of the back-side and visual-side substrates are disposed opposite to each other; at least one light source disposed on one of side surfaces of the transmission type liquid-crystal display panel; and an optical path control layer having a repetitive structure of optical path changing slopes on an outer side of the back-side substrate and being higher in refractive index than the low-refractive-index transparent layer, each of the optical path changing slopes being inclined at an inclination angle in a range of from 35 to 48 degrees with respect to a reference plane of the back-side substrate.

According to the present invention, while incident light from a light source disposed on a side surface of a liquid-crystal display panel by use of liquid-crystal cell substrates, especially by use of back-side one thereof, is transmitted toward an opposite side surface of the liquid-crystal display panel efficiently, the optical path of the transmitted light is changed efficiently toward the visual side of the panel through an optical path control layer disposed on the back of the panel. Hence, the transmitted light can be utilized for liquid-crystal display. A back-lighting mechanism can be formed by the optical path control layer excellent in thickness, and formed by arrangement of a light source on its side surface. A transmission type liquid-crystal display device which is excellent in thickness and weight and which is bright and excellent in display quality can be formed. When a reflector is disposed on the outer side of the optical path control layer, a transmission-reflection double type liquid-crystal display device can be formed easily.

The aforementioned effect is achieved by use of the low-refractive-index transparent layer and the slope reflection type optical path control layer, both the layers being provided on the back-side substrate. That is, light incident on the side surface of the panel can be efficiently transmitted toward a side surface opposite to the first-mentioned side surface by a confinement effect owing to total reflection based on the low-refractive-index transparent layer. Hence, uniformity of brightness on the whole of the display screen is improved, so that good display quality can be attained. If there is no low-refractive-index transparent layer, backward transmission efficiency runs short so that the display screen becomes darker and viewing of the display becomes difficult as the viewing point goes farther from the light source. On the other hand, when the light incident on the side surface or the transmitted light thereof is reflected by optical path changing slopes, the optical path of the light can be changed with good directivity. Hence, it is difficult to attain the aforementioned effect by such a scattering reflection system with a roughened surface as described in Unexamined Japanese Patent Publication No. Hei. 5-158033.

That is, JP 5-158033 has suggested a reflection type liquid-crystal display device in which illumination light is made incident on one of side surfaces of a liquid-crystal display panel and totally reflected by a visual-side cell substrate and in which the reflected light is scattered by a roughened surface type reflection plate so as to be utilized for display. In this case, however, the light which can be utilized for display is the light scattered and exited from the panel against the total reflection conditions. Scattered light generally exhibits a normal distribution with a peak in a regular reflection direction. Accordingly, the display light in the reflection type liquid-crystal display device is too inclined with respect to the frontal (vertical) direction to be effectively utilized for display. As a result, the display is dimmed in the frontal direction. However, in consideration of viewing the display in a reflection mode, if scattering by the roughened surface type reflection plate is intensified, the quantity of light in the frontal direction is reduced to be unfavorable to display. It is therefore necessary for such a roughened surface scattering reflection system to adjust the intensity of scattering so as to keep the balance between transmission and reflection modes. It is, however, difficult for such a roughened surface scattering reflection system to make the intensity of scattering favorable to both the modes because the intensity of scattering required in the transmission mode is incompatible with that required in the reflection mode.

On the other hand, the slope reflection type optical path control layer according to the present invention mainly uses light exhibiting a peak in the regular reflection direction, and controls the optical path of the reflected light. Accordingly, the optical path control layer easily changes the optical path of the light with directivity favorable to display, particularly frontal directivity so that a bright transmission mode can be achieved. The flat portions of the optical path control layer excluding the slopes can be used in the reflection mode, so that both the transmission and reflection modes can be easily balanced into a state favorable to display.

Features and advantages of the invention will be evident from the following detailed description of the preferred embodiments described in conjunction with the attached drawings.

DETAILED DESCRIPTION OF THE PREFERRED EMBODIMENTS

The liquid-crystal display device according to the present invention comprises: a transmission type liquid-crystal display panel including a liquid-crystal cell, the liquid-crystal cell having a back-side substrate, a visual-side substrate, and a liquid crystal, the back-side substrate having a transparent substrate, a transparent layer lower in refractive index than the transparent substrate, and a transparent electrode, the visual-side substrate having a transparent substrate, and a transparent electrode, the liquid crystal being held between the back-side and visual-side substrates so that respective electrode sides of the back-side and visual-side substrates are disposed opposite to each other; at least one light source disposed on one of side surfaces of the transmission type liquid-crystal display panel; and an optical path control layer having a repetitive structure of optical path changing slopes on an outer side of the back-side substrate and being higher in refractive index than the low-refractive-index transparent layer, each of the optical path changing slopes being inclined at an inclination angle in a range of from 35 to 48 degrees with respect to a reference plane of the back-side substrate.

Figure 1:
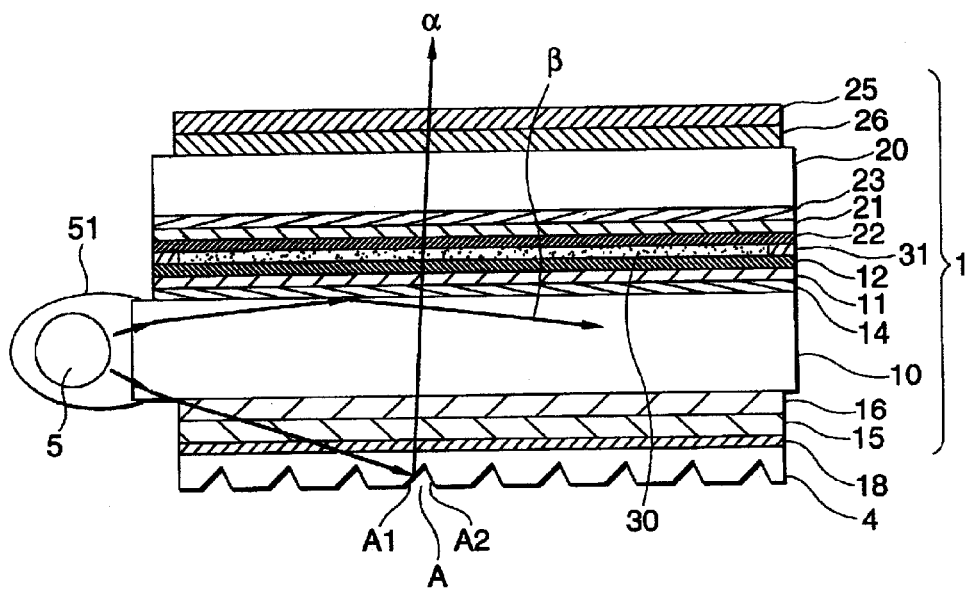
FIG. 1 is a sectional view for explaining an example of a transmission type liquid-crystal display device.
Figure 2:
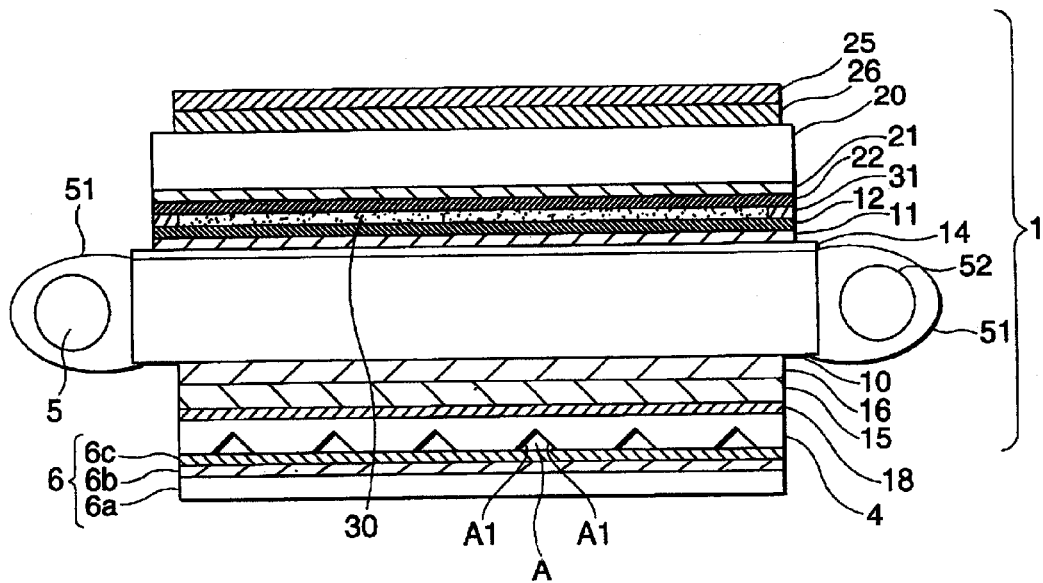
FIG. 2 is a sectional view for explaining an example of a transmission-reflection double type liquid-crystal display device.

FIGS. 1 and 2 show examples of the aforementioned liquid-crystal display device. The reference numeral 1 designates a liquid-crystal display panel; 4, an optical path control layer; A1, optical path changing slopes; 10, a back-side transparent substrate; 14, a low-refractive-index transparent layer; 20, a visual-side transparent substrate; 11 and 21, transparent electrodes; 30, a liquid crystal; and 5 and 52, light sources. Incidentally, the reference numerals 12 and 22 designate aligned films; 15 and 25, polarizers; 16 and 26, phase retarders; 23, a color filter; and 6, a reflector.

A suitable transmission type panel can be used as the liquid-crystal display panel 1 without any specific limitation in kind. For example, as illustrated in FIGS. 1 and 2, the liquid-crystal display panel 1 includes a liquid-crystal cell. The liquid-crystal cell has a back-side substrate 10, a visual-side substrate 20, and a liquid crystal 30. The back-side substrate (10) is constituted by a transparent substrate 10, a transparent layer 14 lower in reflective index than the substrate 10, and a transparent electrode 11, the transparent layer 14 and the transparent electrode 11 being formed on the transparent substrate 10. The visual-side substrate (20) is constituted by a transparent substrate 20 and a transparent electrode 21 formed on the transparent substrate 20. The liquid crystal 30 is held between the two substrates (10) and (20) disposed so that respective electrode 11 and 21 sides of the two substrates (10) and (20) are opposite to each other. Incidence light on the back side on which the optical path control layer 4 is disposed is controlled by the liquid crystal, or the like. As a result, the light is exited as display light from the other side, that is, the visual side. Incidentally, the reference numeral 31 in FIGS. 1 and 2 designates a sealing material for enclosing the liquid crystal 30 between the transparent substrates 10 and 20.

Incidentally, in accordance with the alignment form of the liquid crystal, specific examples of the liquid-crystal cell described above may be classified into: a twisted or non-twisted liquid-crystal cell such as a TN liquid-crystal cell, an STN liquid-crystal cell, a perpendicularly aligned liquid-crystal cell, an HAN liquid-crystal cell or an OCB liquid-crystal cell; a guest-host or ferroelectric liquid-crystal cell; a light-diffuse liquid-crystal cell; and so on. Any suitable method, such as an active matrix method, a passive matrix method, or the like, may be used as a method for driving the liquid crystal. The liquid crystal is typically driven by the transparent electrodes 11 and 21 provided on the respective inner sides of the pair of cell substrates 10 and 20, as illustrated in FIGS. 1 and 2.

As for each of the back-side and visual-side cell substrates, a transparent substrate is used so that illumination light or display light can be transmitted through the transparent substrate. The transparent substrate can be made of a suitable material such as glass, resin, or the like. Particularly, the transparent substrate may be preferably made of an optically isotropic material from the point of view of suppressing birefringence as much as possible to reduce light loss, or the like. In addition, from the point of view of improvement in luminance, display quality, or the like, a material superior in colorlessness and transparency is preferable, such as a non-alkali glass plate which surpasses a blue glass plate. Further, a resin substrate is preferable from the point of view of lightweight properties, or the like.

The low-refractive-index transparent layer provided in the back-side substrate is provided as a layer having a refractive index lower than that of the transparent substrate forming the back-side substrate. Hence, when incident light from the light source 5 is transmitted inside the back-side substrate 10, the transmitted light is totally reflected on the basis of the refractive index difference between the substrate 10 and the transparent layer 14 so as to be efficiently confined in the back-side substrate, as represented by the broken-line arrow β in FIG. 1. Hence, the transmitted light is efficiently transmitted (backward) toward the opposite side surface so that the transmitted light is uniformly supplied to the optical path changing slopes A1 of the optical path control layer 4 in a position far from the light source. That is, the low-refractive-index transparent layer is provided for the purpose of improving uniformity of brightness on the whole display screen through the change of the optical path of the light owing to reflection by the optical path changing slopes A1, as represented by the broken-line arrow a in FIG. 1.

The low-refractive-index transparent layer is also provided for preventing the transmitted light from being reduced or made uneven. This reduction or unevenness is caused by the partial change of the transmission state because the transmitted light suffers birefringence or scattering when the transmitted light enters the liquid-crystal layer. That is, the low-refractive-index transparent layer is provided for the purpose of preventing the display from becoming dark. At the same time, the low-refractive-index transparent layer is also provided for preventing the display quality from being deteriorated because the display in a neighbor of the light source is ghosted in the back. Further, in the case where a color filter or the like is disposed, the low-refractive-index transparent layer is provided for preventing the transmitted light from being absorbed in the color filter to thereby avoid rapid attenuation of the transmitted light. In the liquid-crystal display device in which incident light from the light source is transmitted inside the liquid-crystal layer as suggested in JP 5-158033, the transmitted light is scattered by the liquid-crystal layer to thereby bring about an uneven transmission state. As a result, unevenness of exit light or ghosting occurs to thereby make it difficult to view the display image.

The low-refractive-index transparent layer can be made from a suitable material such as an inorganic or organic low-refractive-index dielectric having a refractive index lower than that of the transparent substrate forming the back-side substrate, by a suitable method such as a vacuum evaporation method or a spin coating method. The material and the method for forming the low-refractive-index transparent layer are not limited specifically. From the point of view of backward transmission efficiency owing to the total reflection or the like, it is preferable that the refractive index difference between the transparent layer and the transparent substrate is as large as possible. It is preferable that the refractive index difference is not smaller than 0.05, especially in a range of from 0.1 to 0.4. This degree of the refractive index difference has little influence on display quality in a reflection mode using external light. Incidentally, when the refractive index difference is 0.1, reflectance of external light in the interface between the transparent layer and the transparent substrate is not larger than 0.1%, that is, reduction of brightness or contrast owing to the reflection loss is very small.

The position of arrangement of the low-refractive-index transparent layer can be determined suitably. The low-refractive-index transparent layer is preferably positioned between the transparent substrate 10 and the transparent electrode 11 as shown in FIGS. 1 and 2 from the point of view of the aforementioned transmitted light confinement effect, prevention of the transmitted light from entering the liquid-crystal layer, and so on. When a color filter is disposed between the transparent substrate 10 and the transparent electrode 11, the low-refractive-index transparent layer is preferably positioned nearer the substrate 10 than the color filter from the point of view of preventing the absorption loss of the transmitted light from being caused by the color filter. Therefore, the low-refractive-index transparent layer 14 is generally provided directly on the back-side substrate 10. In this case, the fact that the surface of the substrate on which the transparent layer is provided is as smooth as possible, that is, the fact that the transparent layer is as smooth as possible, is favorable to prevention of scattering of the transmitted light. The fact is also preferable from the point of view of avoiding any influence on display light. Incidentally, it is generally preferable from the aforementioned point of view that the color filter 23 is disposed on the visual-side substrate 20 side as illustrated shown in FIG. 1.

If the low-refractive-index transparent layer is too thin, the confinement effect maybe weakened because of a wave effusion phenomenon. Therefore, the low-refractive-index transparent layer is preferably selected to be as thick as possible from the point of view of sustaining the total reflection effect. The thickness can be determined suitably from the point of view of the total reflection effect or the like. Generally, the thickness is selected preferably to be not smaller than a quarter wavelength (95 nm), more preferably to be not smaller than half a wavelength (190 nm), further preferably to be not smaller than one wavelength (380 nm), still further preferably to be not smaller than 600 nm, on the basis of the optical path length calculated by multiplying refractive index by layer thickness, from the point of view of the total reflection effect on the visible light with the wavelength in a range of from 380 nm to 780 nm, particularly on the light with the short-wave side wavelength 380 nm.

The thickness of the back-side cell substrate 10 and the thickness of the visual-side cell substrate 20 maybe determined suitably in accordance with the strength of enclosure of liquid crystal, or the like, without any specific limitation. Generally, each of the thicknesses is selected to be in a range of from 10 $\mu$m to 5 mm, especially in a range of 50 $\mu$m to 2 mm, more especially in a range of from 100 $\mu$m to 1 mm from the point of view of balance between light transmission efficiency and reduction in thickness and weight. Particularly when the back-side substrate is used as a substrate for transmitting incident light from the light source as described above, it is favorable that the sectional area of the substrate is as large as possible, that is, it is preferable that the substrate is as thick as possible, from the point of view of incidence efficiency, transmission efficiency, or the like. On the other hand, from the point of view of reduction in thickness and weight, it is favorable that the visual-side substrate is as thin as possible. Therefore, the thickness of the back-side transparent substrate and the thickness of the visual-side transparent substrate may be equal to each other or may be different from each other. Incidentally, each of the transparent substrates may have a uniform thickness or the back-side substrate in particular may be shaped like a wedge in section so that the thickness thereof varies partially for the purpose of improving efficiency of incidence of the transmitted light onto the optical path changing slopes on the basis of the inclination arrangement of the optical path control layer.

The plan size of the back-side transparent substrate and the plan size of the visual-side transparent substrate may be also equal to each other or may be different from each other. When the back-side substrate is used as a substrate for transmitting incident light from the light source, it is preferable that the side surface of the back-side substrate 10 is protruded more greatly than the side surface of the visual-side substrate 20 at least in the side surface where the light source 5 or 52 is disposed, from the point of view of efficiency of incidence, or the like, in the case where the light source is disposed on the protruded side surface as illustrated in FIGS. 1 and 2.

The transparent electrode 11 or 21 to be provided on the back-side transparent substrate 10 or the visual-side transparent substrate 20 may be made of any known suitable material such as ITO. When the liquid-crystal cell is formed, at least one suitable functional layer may be provided in accordance with necessity, such as: an aligned film composed of a film subjected to rubbing for aligning the liquid crystal; a color filter for color display; and so on. Incidentally, aligned films 12 and 22 are generally formed on the transparent electrodes 11 and 21 respectively as illustrated in FIGS. 1 and 2, and a color filter 23 is generally provided between one of the cell transparent substrates 10 and 20 and a corresponding transparent electrode. In FIG. 1, the color filter 23 is provided on the visual-side substrate 20.

In the liquid-crystal display panel, the liquid-crystal cell may be additionally provided with at least one kind of suitable optical layers such as polarizers 15 and 25, phase retarders 16 and 26, light diffusing layers, and so on, as illustrated in FIGS. 1 and 2. The object of the polarizers is to attain display utilizing linearly polarized light, while the object of the phase retarders is to improve display quality through the compensation of a retardation caused by the birefringence of the liquid crystal, or the like. On the other hand, the objects of the light diffusing layers are: enlargement of the display area by diffusing display light; uniformity of luminance by leveling emission-line-like emission light by means of the optical path changing slopes of the optical path control layer; increase in the quantity of light incident on the optical path control layer by diffusing transmitted light in the liquid-crystal display panel; and so on.

As the polarizer, any suitable plate may be used without any specific limitation. From the point of view of obtaining display with a good contrast ratio based on the incidence of highly linearly polarized light, it is possible to preferably use a polarizer with a high degree of polarization, for example, such as: an absorption type polarizing film formed in such a manner that a dichromatic substance such as iodine or dichromatic dye is adsorbed into a hydrophilic polymeric film such as a polivinyl alcohol film, a partially formalized polivinyl alcohol film, or a partially saponified ethylene-vinyl acetate copolymer film, and then the film which has adsorbed the dichromatic substance is drawn to extend; a polarizing film in which a transparent protective layer is provided on one side or both sides of the aforementioned absorption type polarizing film; or the like.

A material excellent in transparency, mechanical strength, thermal stability, moisture sealability, and so on, is preferably used for the formation of the aforementioned transparent protective layer. Examples of the material may include: polymer such as acetate resin, polyester resin, polyether sulfone resin, polycarbonate resin, polyamide resin, polyimide resin, polyolefin resin, acrylic resin, polyether resin, polyvinyl chloride resin, styrene resin, or norbornane resin; thermosetting or ultraviolet-curing resin such as acrylic resin, urethane resin, acrylic-urethane resin, epoxy resin, silicon resin, or the like; etc. The transparent protective layer may be attached by a bonding method in the form of a film, or by a coating method in the form of a polymer solution or the like.

The polarizer to be used, especially the visual-side polarizer, may be subjected to non-glare treatment or anti-reflection treatment for preventing viewing from being disturbed by surface reflection of external light. Non-glare treatment can be made to form a surface of the polarizer as a fine prismatic structure. In the non-glare treatment, various methods maybe used for forming a surface of the polarizer as a fine prismatic structure. Examples of the methods include: a surface roughening method such as a sandblasting method, an embossing method, etc.; a method of mixing transparent particles such as silica particles; and so on. Anti-reflection treatment can be made by a method of forming a coherent vapor deposition film, or the like. Alternatively, non-glare treatment or anti-reflection treatment can be made by a method of bonding a film having a surface structure of fine prismatic structures or an interference film. Incidentally, two polarizers may be provided on opposite sides of the liquid-crystal cell respectively, as shown in the FIGS. 1 and 2, or one polarizer may be provided on only one side of the liquid-crystal cell.

On the other hand, the phase retarder may be formed by use of a suitable plate, such as: a birefringent film obtained in such a manner that a film composed of any suitable polymer as listed above in the case of the aforementioned transparent protective layer is drawn to extend by a suitable method such as uniaxal or biaxial drawing method, or the like; an aligned film of suitable nematic or discotic liquid-crystal polymer or the like; such an aligned film in which the aligned layer is supported by a transparent substrate; or the like. Alternatively, the phase retarder may be a heat-shrinkable film the thickness-direction refractive index of which is controlled under the effect of shrinkage by heating. The compensating phase retarders 16 and 26 are generally disposed between the visual-side and/or back-side polarizers 15, 25 and the liquid-crystal cell in accordance with necessity as illustrated in FIGS. 1 and 2. As the phase retarders, suitable plates may be used in accordance with the wavelength range or the like. In addition, each of the phase retarders may be used in the form of two or more layers superposed on each other in order to control optical properties such as a retardation or the like.

A coating layer, a diffusing sheet, or the like, having a surface structure of fine prismatic structures similarly to that of the non-glare layer can be used to form the light diffusing layer by a suitable method. The light diffusing layer may be disposed as a transparent particles-containing adhesive layer. In this case, the light diffusing layer can serve also as an adhesive layer for bonding the polarizer and the phase retarder so that reduction in thickness can be achieved. A suitable adhesive agent may be used for the formation of the adhesive layer. The suitable adhesive agent contains, as a base polymer, a suitable polymer such as a rubber polymer, an acrylic polymer, a vinyl-alkyl-ether polymer, a silicone polymer, a polyester polymer, a polyurethane polymer, a polyether polymer, polyamide polymer, a styrene polymer, etc.

Especially, an adhesive agent excellent in transparency, weather resistance, heat resistance, etc. such as an acrylic adhesive agent containing, as a base polymer, a polymer mainly containing alkyl ester of acrylic acid or methacrylic acid is used preferably to form the adhesive layer. As the transparent particles mixed with the adhesive layer, there can be used one or two or more members suitably selected from the group consisting of inorganic particles of silica, alumina, titania, zirconia, tin oxide, indium oxide, cadmium oxide, antimony oxide, or the like, which have an average particle size, for example, in a range of from 0.5 to 20 $\mu$m and may be electrically conductive; and organic particles of a crosslinked or non-crosslinked polymer, or the like.

The light source disposed on the side surface of the liquid-crystal display panel is provided so that light used as illumination light for the liquid-crystal display device is made incident on the side surface of the liquid-crystal display panel. Thus, reduction in thickness and weight of the liquid-crystal display device can be attained by combination of the light source with the optical path control layer disposed on the back side of the panel. From the point of view of preventing incident light from the light source from entering the liquid-crystal layer, there is a preferable method in which the light source is disposed on the side surface of the back-side substrate as described above, especially on the side surface of the back-side substrate which is protruded more greatly than the side surface of the visual-side substrate.

A suitable material may be used as the light source. Preferable examples of the material may include: a linear light source such as a (cold or hot) cathode-ray tube or the like; a point light source such as a light-emitting diode or the like; an array in which such point light sources are set in a linear or planar array or the like; a combination of a point light source and a linear light pipe through which incident light from the point light source is converted into a linear light source; and so on. As illustrated in FIGS. 1 and 2, the light source 5 (52) may be disposed on at least one side surface of the liquid-crystal display panel. In the case where light sources are disposed on two or more side surfaces, the side surfaces maybe used as a combination of opposite side surfaces as shown in FIG. 2, or as a combination of side surfaces intersecting lengthwise and crosswise, or as a combination of three or more side surfaces using both the aforementioned combinations.

Switching on the light source allows visual recognition in the transmission mode. When visual recognition is made in the reflection mode using external light in the case of a transmission-reflection double liquid-crystal display device, it is unnecessary to switch on the light source. Therefore, the light source is made switchable on/off. As the switching method, any suitable method may be adopted, or any background-art method may be adopted. Incidentally, the light source may be of a multi-color light emission system which can change over between emission colors. Alternatively, lights with different colors may be emitted from different kinds of light sources.

In accordance with necessity, as illustrated in FIGS. 1 and 2, each of the light source 5 and 52 may be formed in a combined body in which a suitable assisting means such as a light source holder 51 is provided for surrounding the light source to guide divergent light to the side surface of the liquid-crystal display panel. As the light source holder, a suitable reflection sheet which can reflect at least light from the light source may be used. As the reflection sheet, it is possible to use a resin sheet provided with a high reflectance metal thin film, a white sheet, a metal foil sheet, or the like. The light source holder may be used as a retaining means also having a function of surrounding the light source in such a manner that end portions of the light source holder are bonded to end portions of upper and lower surfaces of a cell substrate of the liquid-crystal display panel, especially to end portions of upper and lower surfaces of the back-side substrate.

The optical path control layer is provided for the following object. That is, the optical path of the incident light from the light source 5 disposed on the side surface of the liquid-crystal display panel 1 or the optical path of the transmitted incident light is changed toward the visual side of the panel through the optical path changing slopes A1 as represented by the arrow a in FIG. 1, and the light is used as illumination light (display light). The optical path control layer is disposed on the outside of the back-side substrate 10 of the liquid-crystal display panel 1.

In order to achieve the aforementioned object, the optical path control layer 4 is provided with optical path changing slopes A1 each inclined at an inclination angle in a range of from 35 to 48 degrees with respect to a reference plane (virtual horizontal plane) of the back-side substrate so that the incident light from the light sources 5 and 52 is reflected to thereby change the optical path of the light into a predetermined direction as illustrated in FIGS. 1 and 2. The optical path control layer has a repetitive structure of the optical path changing slopes for the purpose of attaining reduction in its thickness. The optical path control layer is formed as a layer having a refractive index higher than that of the low-refractive-index transparent layer provided on the back-side substrate. If the refractive index of the optical path control layer is lower than that of the transparent layer, the incident light from the light source or the transmitted light thereof is apt to be confined in the back-side substrate. As a result, incidence of light onto the optical path control layer is disturbed so that the light can be hardly used as display light.

The optical path control layer can be formed as a layer having any suitable form except that the optical path control layer must have such a repetitive structure of the predetermined optical path changing slopes. From the point of view of changing the optical path of the light to obtain display light excellent in frontal directivity, the optical path control layer is preferably provided as an optical path control layer having a repetitive structure of a plurality of optical path changing means A having optical path changing slopes A1 facing the side surface where the light source is disposed, that is, facing the incidence side surface, and more preferably provided as an optical path control layer having a repetitive structure of a plurality of optical path changing means A which have optical path changing slopes A1 and which are formed into prismatic structures.

Figure 3A:
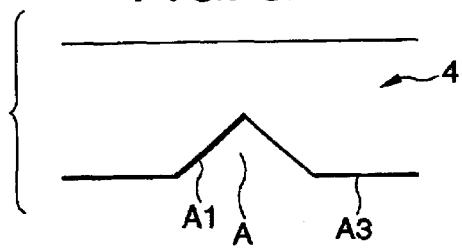
FIGS. 3A to 3E are side views for explaining optical path changing means in an optical path control layer.
Figure 3B:
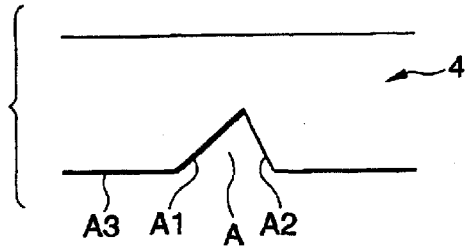
Figure 3C:
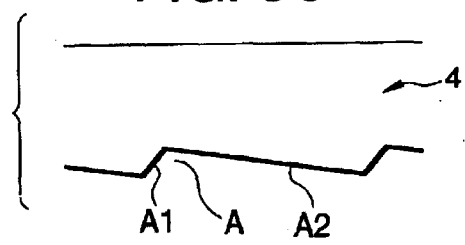
Figure 3D:
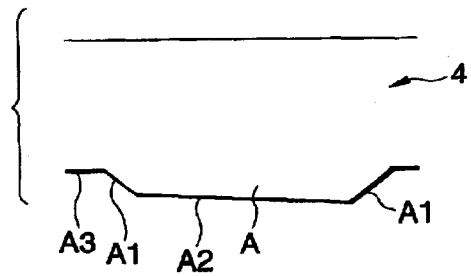
Figure 3E:
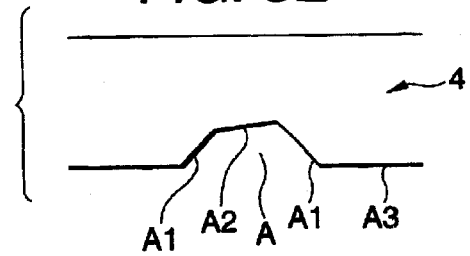

FIGS. 3A to 3E show examples of the optical path changing means A with the optical path changing slopes or prismatic structures described above. In FIGS. 3A to 3C, each of the optical path changing means A is shaped substantially like a triangle in section. In FIGS. 3D and 3E, it is shaped substantially like a quadrangle in section. In addition, in FIG. 3A, each of the optical path changing means A has two optical path changing slopes A1 constituted by two equalateral sides of an isosceles triangle. In FIG. 3B, each of the optical path changing means A has an optical path changing slope A1, and a steep slope A2 having a larger inclination angle than that of the slope A1 with respect to the reference plane. On the other hand, in FIG. 3C, each of the optical path changing means A has an optical path changing slope A1, and a gentle slope A2 having a smaller inclination angle than that of the slope A1 with respect to the reference plane. Further, in FIG. 3C, a repetitive structure in which the optical path changing means A are continuously adjacent to one another is formed all over the one side surface of the optical path control layer. In FIG. 3D, the optical path changing means A are constituted by convex portions (protrusions). In FIG. 3E, the optical path changing means A are constituted by concave portions (grooves)

As described in the above examples, therefore, the optical path changing means may be constituted by convex or concave portions each made of equilateral sides or slopes with equal inclination angles, or may be constituted by convex or concave portions each made of a combination of an optical path changing slope and a steep or gentle slope or slopes different in inclination angle. The format of the slopes may be determined suitably in accordance with the number and positions of side surfaces where light is made incident. From the point of view to improve mar-proofness to thereby maintain the function of the slopes, it is favorable to form the optical path changing means into concave portions rather than convex portions because the slopes, or the like, in the concave portions are rarely damaged.

From the point of view to attain the aforementioned characteristic such as frontal directivity, or the like, it is preferable that the optical path control layer has the optical path changing slopes A1 each of which has an inclination angle in a range of from 35 to 48 degrees with respect to the reference plane and which face the side surface where light is incident, as illustrated in FIGS. 3A to 3E. Therefore, when light sources are disposed on two or more side surfaces of the liquid-crystal display panel so that two or more incidence side surfaces are provided, it is preferable to use an optical path control layer having optical path changing slopes A1 formed in accordance with the number and positions of the side surfaces.

Incidentally, in the case where light sources 5 and 52 are disposed on two opposite side surfaces of the liquid-crystal display panel 1 as illustrated in FIG. 2, it is preferable to use an optical path control layer 4 having optical a plurality of path changing means A each having two optical path changing slopes A1 provided in the following manner. That is, as shown in FIG. 3A, the ridgelines of the two optical path changing slopes A1 of each optical path changing means A which is shaped substantially like an isosceles triangle in section go parallel with the aforementioned side surfaces. Alternatively, as shown in FIGS. 3D and 3E, the ridge lines of the two optical path changing slopes A1 of each optical path changing means A which is shaped substantially like a trapezoid in section go parallel with the incidence side surfaces. On the other hand, in the case where light sources are disposed on two side surfaces of the liquid-crystal display panel which intersect lengthwise and crosswise, it is preferable to use an optical path control layer having optical path changing slopes A1 the ridgelines of which go parallel with the two lengthwise and crosswise directions correspondingly to the side surfaces. Further, in the case where light sources are disposed on three or more side surfaces including opposite side surfaces and lengthwise and crosswise side surfaces, it is preferable to use an optical path control layer having optical path changing slopes A1 constituted by the combination of the aforementioned slopes.

The aforementioned optical path changing slopes A1 play the following role. That is, of the light incident on the side surfaces from the light sources and the transmitted light of the incident light, the slopes A1 reflect the light incident thereon to change the optical path of the light to thereby supply the light to the back side of the liquid-crystal display panel. In this case, the inclination angle of the optical path changing slopes A1 with respect to the reference plane is set to be in a range of from 35 to 48 degrees. Thus, as represented by the broken-line arrow a in FIG. 1, the optical path of the light incident on the side surfaces or the transmitted light thereof can be changed with good perpendicularity to the reference plane so that display light excellent in frontal directivity can be obtained efficiently. If the aforementioned inclination angle is smaller than 35 degrees, the optical path of the reflected light is displaced largely from the frontal direction. Thus, it is difficult to use the reflected light effectively for display, and the frontal luminance becomes low. On the contrary, if the inclination angle exceeds 48 degrees, light leaking from the optical path changing slopes increases due to the contrariety to the condition that the light incident on the side surfaces or the transmitted light thereof is totally reflected. Thus, the utilization efficiency of the light incident on the side surfaces is deteriorated.

From the point of view of changing the optical path with excellent frontal directivity, restraining light from leaking, or the like, the inclination angle of the optical path changing slopes A1 is preferably in a range of from 38 to 45 degrees, more preferably in a range of from 40 to 44 degrees in consideration of the total reflection conditions based on the refraction of the transmitted light in the liquid-crystal display panel in accordance with Snell's law, and so on. Incidentally, the total reflection condition of a glass plate is generally 41 degrees. In this case, light incident on the side surface is incident on the optical path changing slopes while the light is transmitted in a state in which the light is condensed in a range of ±41 degrees.

Figure 4:
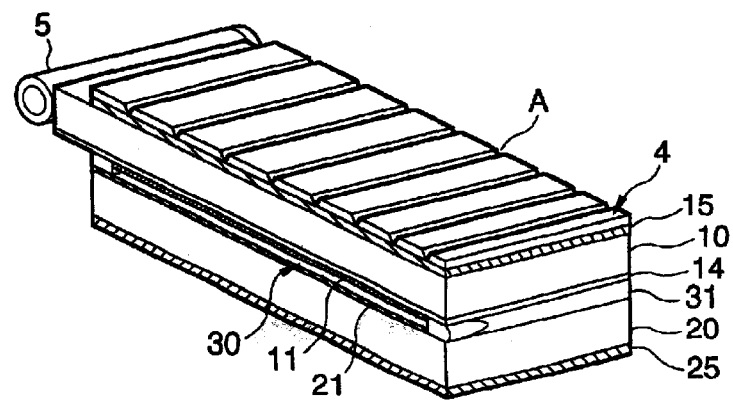
FIG. 4 is a perspective view for explaining an example of the liquid-crystal display device.
Figure 5:
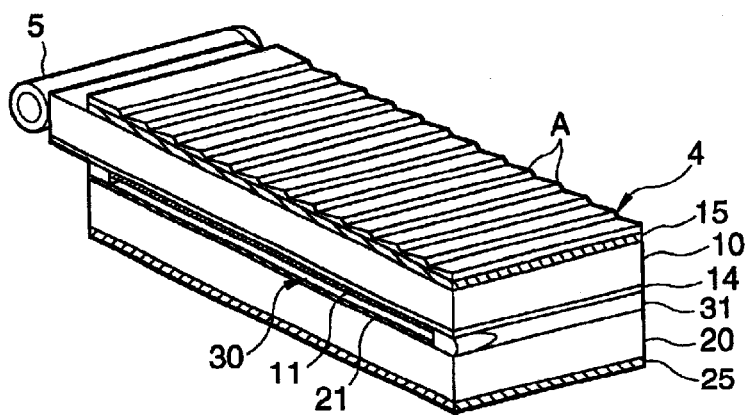
FIG. 5 is a perspective view for explaining another example of the liquid-crystal display device.
Figure 6:
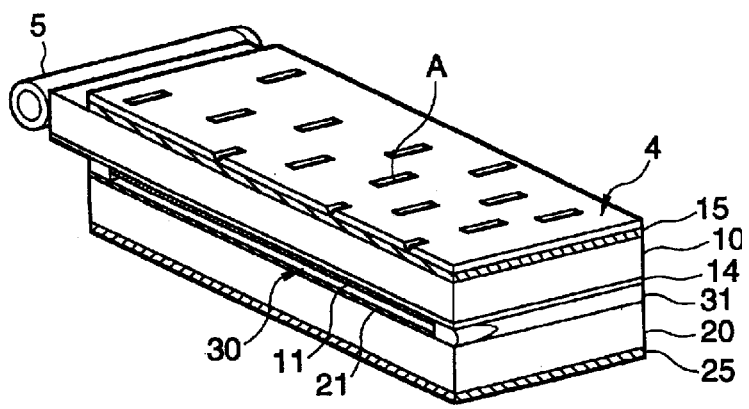
FIG. 6 is a perspective view for explaining a further example of the liquid-crystal display device.

The plurality of optical path changing means A having the optical path changing slopes A1 are formed as a repetitive structure as illustrated in FIGS. 4, 5 and 6 in order to reduce the thickness of the optical path control layer as described above. In this case, from the point of view of reflecting the light incident on one side surface backward and efficiently transmitting the reflected light to a side surface opposite to the aforementioned back side surface, as represented by the polygonal line β in FIG. 1, so as to emit the light on the whole surface of the liquid-crystal display as uniformly as possible, the structure is preferably formed as a structure including gentle slopes A2 each inclined at an inclination angle of not larger than 10 degrees, especially not larger than 5 degrees, more especially not larger than 3 degrees with respect to the reference plane, or including flat surfaces A3 each inclined at an inclined angle of substantially 0 degree with respect to the reference plane as shown in FIGS. 3A to 3E by way of example. It is therefore preferable that the plurality of optical path changing means A including the steep slopes A2 illustrated in FIG. 3B have a structure in which the inclination angle of the steep slopes A2 is set to be not smaller than 35 degrees, particularly not smaller than 50 degrees, more particularly not smaller than 60 degrees with respect to the reference plane, so that the width of the flat surfaces A3 can be enlarged.

When a reflector 6 is disposed on the back side (outer side) of the optical path control layer 4 as illustrated in FIG. 2, the aforementioned gentle slopes A2 or flat surfaces A3 can be made to function as portions of incidence of external light and as portions of transmission of the incident light reflected by the reflector 6. Thus, it becomes possible to form a transmission-reflection double type liquid-crystal display device that can also perform display in a reflection mode using external light with the light sources switched off.

In the aforementioned case, particularly when the optical path control layer 4 has a repetitive structure of a plurality of optical path changing means A each of which is constituted by the slopes A1 and A2 and which are repeated adjacently to one another as shown in FIG. 3B, it is preferable that any difference in inclination angle with respect to the reference plane between any two gentle slopes A2 in the whole of the optical path control layer is set to be not larger than 5 degrees, especially not larger than 4 degrees, more especially not larger than 3 degrees. Further, it is preferable that any difference in inclination angle between any two gentle slopes adjacent to each other is set to be not larger than 1 degree, especially not larger than 0.3 degree, more especially not larger than 0.1 degree. This is to prevent the optimum viewing direction of the liquid-crystal display device, especially the optimum viewing direction in a neighbor of the frontal direction from changing largely because of transmission of the light through the gentle slopes A2, and particularly to prevent the optimum viewing direction from changing largely between adjacent gentle slopes. In addition, from the point of view of obtaining bright display in the reflection mode, it is preferable that the projected area of the gentle slopes A2 on the reference plane is set to be not smaller than 5 times, especially not smaller than 10 times, more especially not smaller than 15 times as large as that of the optical path changing slopes A1 on the reference plane. This is to improve the incidence efficiency of external light and the transmission efficiency of the display light reflected by the reflector.

The optical path changing means A are provided so that their ridgelines go parallel with or are inclined to the incidence side surface of the liquid-crystal display panel 1 on which the light source 5 is disposed as illustrated in FIGS. 4 to 6. In this case, the optical path changing means A may be formed continuously from one end of the optical path control layer to the other end thereof as illustrated in FIGS. 4 and 5, or may be formed discontinuously and intermittently as illustrated in FIG. 6. When the optical path changing means A are formed discontinuously, it is preferable that the length of prismatic structures, which are constituted by grooves or protrusions, in the direction along the incidence side surface is made not smaller than 5 times as long as the depth or height of the prismatic structures from the point of view of the incidence efficiency or the optical path changing efficiency of the transmitted light, or the like. In addition, it is preferable that the aforementioned length is set to be not larger than 500 µm, especially in a range of from 10 to 480 µm, more especially in a range of from 50 to 450 µm, from the point of view of uniform light emission on the display surface of the panel.

There is no specific limit on the sectional shape of the optical path changing means A or the repetitive pitch of the optical path changing slopes A1. The optical path changing slopes A1 are luminance-determining factors in the transmission (switching-on) mode. Therefore, the shape and pitch of the optical path changing slopes A1 can be determined suitably in accordance with the uniformity of light emission on the display surface of the panel, the uniformity of light emission on the display surface of the panel in the reflection mode in the case of a transmission-reflection double type display device, and so on. Thus, the quantity of optical-path-changed light can be controlled by the distribution density of the optical path changing slopes A1. Accordingly, the slopes A1, A2, etc. may have a shape with a fixed inclination angle, or the like, all over the surface of the optical path control layer. Alternatively, in order to cope with absorption loss or attenuation of the transmitted light because of the changing of its optical path and uniformalize light emission on the display surface of the panel, the optical path changing means A may be made larger as it goes farther from the side surface where light is incident, as illustrated in FIG. 7.

Figure 7:
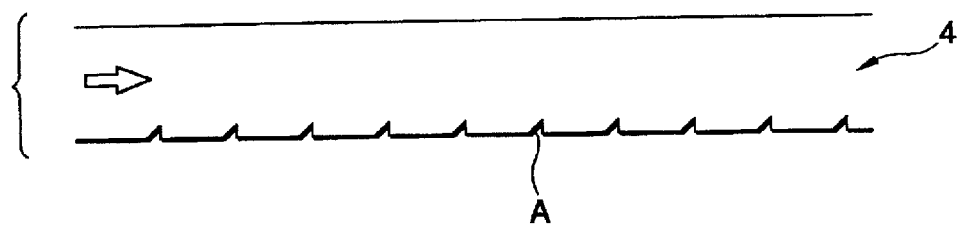
FIG. 7 is a side view for explaining an example of the optical path control layer.
Figure 8:
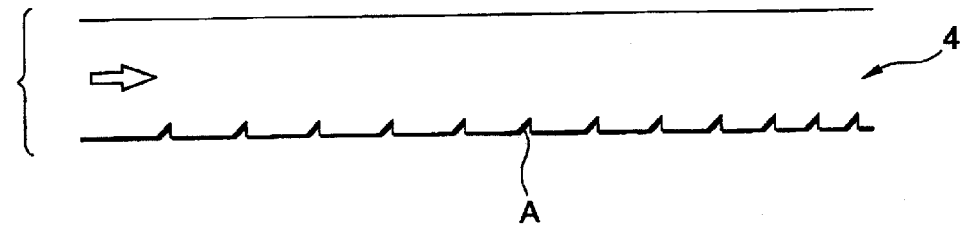
FIG. 8 is a side view for explaining another example of the optical path control layer.

Further, the optical path changing means A may be made to have a fixed pitch as illustrated in FIG. 7, or may be made to have a pitch which is reduced gradually to thereby increase the distribution density of the optical path changing means A as it goes farther from the side surface where light is incident as illustrated in FIG. 8. Further, uniform light emission may be attained on the display surface of the panel by a random pitch. In addition, when the optical path changing means A are made of prismatic structures constituted by discontinuous grooves or protrusions, the size, the shape, the distribution density, the ridgeline direction, etc. of the prismatic structures may be made irregular, or the irregular or regular or standardized prismatic structures may be arranged at random so that uniform light emission on the display surface of the panel can be attained. Hence, uniform light emission on the display surface of the panel can be achieved by application of a suitable method to the optical path changing means A as described in the above examples. Incidentally, the arrow direction in FIGS. 7 and 8 designates the direction of transmission of the light incident on the side surface.

Incidentally, when the optical path changing slopes A1 overlap with pixels of the liquid-crystal cell in the case of a transmission-reflection double type liquid-crystal display device, display may become unnatural due to insufficient transmission of display light. From the point of view to prevent such insufficiency, it is preferable that the overlapping area is made as small as possible, so as to ensure sufficient light transmittance through the gentle slopes A2 or the flat surfaces A3. In consideration of not only such a point but also the fact that the pixel pitch of the liquid-crystal cell is generally in a range of from 100 to 300 µm, it is preferable that the optical path changing slopes A1 are formed so that the projected width thereof on the reference plane is not larger than 40 µm, especially in a range of from 3 to 20 µm, more especially in a range of from 5 to 15 µm. Since the coherence length of a fluorescent tube is generally set to be about 20 µm, such a projected width is preferable also from the point of view to prevent the display quality from deteriorating due to diffraction.

On the other hand, from the aforementioned point of view, it is preferable that the optical path changing slopes A1 have large intervals. However, the optical path changing slopes A1 function as substantial portions for forming illumination light by changing of the optical path of light incident on the side surface as mentioned above. Accordingly, if the interval is too wide, illumination is sparse at the time of switching on the light source so that display may be unnatural. In consideration of these facts, it is preferable that the repetitive pitch of the optical path changing slopes A1 is set to be not larger than 2 mm, especially in a range of from 20 µm to 1 mm, more especially in a range of from 50 µm to 0.5 mm.

When the optical path changing means are formed into repetitive prismatic structures, moire may occur because of interference between the optical path changing means and the pixels of the liquid-crystal cell. Although moire can be prevented by adjustment of the pitch in the repetitive structure, there is a preferable range in the pitch of the repetitive structure as mentioned above. Hence, counter measures against the case where moire still occurs even if the pitch is in the aforementioned preferable range become a problem. According to the present invention, the prismatic structures are preferably formed so that their ridgelines are inclined with respect to the incidence side surface. Thus, the repetitive prismatic structures can be arrayed across the pixels so as to prevent moire. In this case, if the inclination angle with respect to the incidence side surface is too large, deflection may occur in reflection of the light by the optical path changing slopes A1. As a result, large deviation may occur in the changed direction of the optical path. This is apt to cause lowering of display quality. Therefore, the inclination angle of the ridgelines of the prismatic structures with respect to the incidence side surface is preferably set to be in a range of ±30 degrees, more preferably in a range of ±25 degrees. Incidentally, the symbol "±" means the direction of inclination of the ridgelines with the incidence side surface as a reference. If the resolution of the liquid-crystal cell is low enough not to produce moire, or if moire is negligible, it is preferable that such ridgelines are formed to be as parallel with the incidence side surface as possible.

The optical path control layer can be made of a suitable material exhibiting transparency in accordance with the wavelength range of light from the light source and having a refractive index higher than that of the low-refractive-index transparent layer. Incidentally, examples of the material used in a visible light range may include polymer, curable resin, and glass, as described above in the description of the transparent protective layer by way of example. An optical path control layer made of a material exhibiting no birefringence or little birefringence is preferable. From the point of view of suppressing the quantity of loss light which is confined in the panel because of the aforementioned interface reflection so as to be unable to exit from the panel, and from the point of view of efficiently supplying the light incident on the side surface or the transmitted light thereof to the optical path control layer, especially to the optical path changing slopes A1 of the optical path control layer, it is preferable that the optical path control layer has a refractive index higher by 0.05 or more, especially by 0.08 or more, more especially by a value of from 0.1 to 0.4 than that of the low-refractive-index transparent layer. In addition, from the point of view in which the incident light from the light source or the transmitted light thereof is made incident on the optical path control layer from the back-side substrate efficiently so as to achieve bright display through the optical path changing slopes, it is preferable that the optical path control layer has such a refractive index that the refractive index difference between the optical path control layer and the back-side substrate is not larger than 0.15, especially not larger than 0.10, more especially not larger than 0.05 and particularly the optical path control layer has a refractive index higher than that of the back-side substrate.

The optical path control layer can be formed by a cutting method or by any suitable method. Preferable examples of the method for producing the optical path control layer from the point of view of mass production, or the like, may include: a method in which a thermoplastic resin is pressed against a mold capable of forming a predetermined shape by heating to thereby transfer the shape; a method in which a mold capable of forming a predetermined shape is filled with a heat-melted thermoplastic resin or a resin fluidized by heat or by a solvent; a method in which a fluid resin polymerizable by heat, by ultraviolet rays or radial rays or the like is polymerized in the condition that the fluid resin is cast in a mold capable of forming a predetermined shape or in the condition that the mold is filled with the fluid resin; or the like. Hence, the optical path control layer may be formed by adding the predetermined shape directly to the back-side substrate, or the like, or may be formed as a transparent sheet, or the like, having the predetermined shape. Although the thickness of the optical path control layer can be determined suitably, it is generally set to be not thicker than 300 $\mu$m, especially in a range of from 5 to 200 $\mu$m, more especially in a range of from 10 to 100 $\mu$m, from the point of view of reducing the thickness of the optical path control layer.

The optical path control layer is disposed on the back side of the liquid-crystal display panel. In this case, it is preferable that the slope-forming surface of the optical path control layer, that is, the surface where the optical path changing means A are formed, is disposed on the outer side (back side) as illustrated in FIGS. 1 and 2, from the point of view of the efficiency of reflection of the light by the optical path changing slopes A1 of the optical path changing means A and, accordingly, improvement of luminance based on effective utilization of the light incident on the side surface, and so on. When the optical path control layer is formed independently as a transparent sheet as described above, it is preferable from the aforementioned point of view that the transparent sheet is bonded to the liquid-crystal display panel through an adhesive layer 18 having a refractive index higher than that of the low-refractive-index transparent layer 14, especially an adhesive layer having a refractive index as equal to that of the transparent sheet as possible, more especially an adhesive layer having a refractive index between that of the transparent sheet and that of the back-side substrate.

Hence, the refractive index of the adhesive layer can be set in accordance with the optical path control layer. The adhesive layer can be made of any suitable transparent adhesive agent without any specific limitation in kind. A bonding method by use of an adhesive layer is preferable from the point of view of easiness of the bonding treatment, or the like. The adhesive layer can be set in accordance with the above description and may be provided as the aforementioned light-diffusing type adhesive layer.

As illustrated in FIG. 2, the reflector 6 may be disposed on the outer side, that is, on the back side of the optical path control layer 4 in accordance with necessity. The reflector is provided for reflecting and inverting light leaking from the optical path control layer and for making the reflected and inverted light incident on the optical path control layer again. As a result, light utilizing efficiency can be improved, so that a reflection-transmission double type liquid-crystal display device can be formed by using the light reflected from the liquid-crystal cell side. The reflector can be formed of a suitable material such as a white sheet similarly to the background art.

The reflector is preferably a high-reflectance reflector. Especially, examples of the preferable reflector may include: a coating layer containing powder of a high-reflectance metal such as aluminum, silver, gold, copper, chromium, etc., or alloy powder of such a high-reflectance metal in a binder resin; a metal thin film layer in which the above-mentioned metal or a dielectric multilayer film is deposited by a suitable thin-film forming method such as a vacuum vapor deposition method, a sputtering method, or the like; a reflection sheet having the coating layer or the deposited layer supported by a base material made of a film, or the like; a sheet of metal foil; and so on. The reflector is especially preferably used for forming a reflection-transmission double type liquid-crystal display device. Incidentally, in the case shown in FIG. 2, the reflector 6b is made of a metal thin film attached to a transparent support substrate 6a and is bonded to the optical path control layer through an adhesive layer 6c having a refractive index lower than that of the optical path control layer 4 and lower than that of the transparent substrate 10, to thereby improve the utilization efficiency of the light.

The reflector to be provided may exhibit alight diffusing function. The reflector has a diffuse reflection surface for diffusing the reflected light to thereby attain improvement in frontal directivity. When the diffusing reflection surface is formed by a surface roughening process, the reflector can prevent the production of Newton rings due to its close contact with the optical path control layer to there by improve visibility. Hence, the reflector may be simply put on the outer side of the optical path control layer or may be disposed so as to adhere closely thereto by a bonding method, a vapor deposition method, or the like. When the reflector is disposed so as to adhere closely to the slopes of the optical path changing means, the reflecting effect can be improved to thereby prevent leaking light almost perfectly to improve viewing angle characteristic and luminance more greatly.

The formation of the light-diffusing type reflector can be made by a method, for example, comprising the steps of: forming a surface of a film base material as fine prismatic structures by a suitable method such as a surface roughening method using sandblasting, matting, or the like, or a particle adding method; and providing a reflector on the film base material so that the fine prismatic structures structure is reflected in the reflector. The reflector having such fine prismatic structures to reflect the fine prismatic structures on the surface of the film base material can be formed by depositing a metal on the surface of the film base material by a suitable vapor deposition or plating method such as a vacuum vapor deposition method, an ion-plating method, a sputtering method, or the like.

In the liquid-crystal display device according to the present invention, a larger part of the light incident on the incidence side surface is transmitted backward through reflection through the liquid-crystal display panel, especially through the back-side substrate of the liquid-crystal display panel in accordance with the law of refraction. Hence, while the light is prevented from exiting (leaking) from the surface of the panel, the optical path of the light incident on the optical path changing slopes A1 of the optical path control layer is efficiently changed to the viewing direction with good perpendicular directivity. The other part of the transmitted light is further transmitted backward by total reflection so as to be incident on the optical path changing slopes A1 on the back. Hence, the optical path of the other part of the transmitted light is efficiently changed to the viewing direction with good perpendicular directivity. As a result, display excellent in uniformity of brightness on the whole display surface of the panel can be achieved. Accordingly, there can be formed a transmission type or transmission-reflection double type liquid-crystal display device which can use the light from the light source efficiently and which is bright, easy to view and excellent in display quality.

Incidentally, in the present invention, optical devices or parts such as an optical path control layer, a liquid-crystal cell, a polarizer, a phase retarder, etc. for forming the liquid-crystal display device may be wholly or partially integrally laminated/fixed onto one another or may be disposed to be separable easily from one another. From the point of view of prevention of lowering of contrast based on suppression of interface reflection, or the like, it is preferable that such optical devices or parts are fixed onto one another. A suitable transparent adhesive layer made of an adhesive agent or the like can be used for the fixing/bonding process. The transparent adhesive layer may contain the aforementioned transparent particles so that the adhesive layer exhibits a diffusing function, or the like. In addition, the aforementioned optical devices or parts, particularly those on the visual side may be made to have ultraviolet absorbing ability, for example, by a method of treating them with an ultraviolet absorbing agent such as salicylic ester compound, benzophenone compound, benzotriazole compound, cyanoacrylate compound, nickel complex compound, or the like.

REFERENCE EXAMPLE 1

Magnesium fluoride was applied onto a non-alkali glass plate having a thickness of 0.7 mm and a refractive index of 1.52 by vacuum vapor deposition to thereby form a low-refractive-index transparent layer having a thickness of 600 nm and a refractive index of 1.38 on the non-alkali glass plate. Red, blue and green stripe-like color filter layers and an ITO transparent electrically conductive layer were successively formed on the low-refractive-index transparent layer. Then, a polyvinyl alcohol solution was applied thereon by spin coating. The dried film obtained thus was subjected to a rubbing treatment. Thus, a back-side substrate was obtained. On the other hand, an ITO transparent electrically conductive layer was formed on a non-alkali glass plate in the same manner as described above. The transparent electrode obtained thus was divided by etching. Then, a film subjected to a rubbing treatment was provided thereon. Thus, a visual-side substrate was obtained.

Then, a gap adjusting material was disposed while the back-side substrate and the visual-side substrate were disposed to be opposite to each other so that the rubbing directions of the respective rubbing surfaces of the two substrates crossed each other perpendicularly. After the periphery of the two substrates was sealed with an epoxy resin, liquid crystal (ZLI-4792, made by MERCK & Co., Inc.) was injected between the two substrates to thereby form a TN liquid-crystal cell. Polarizers (NPF EGW1145DU, made by NITTO ELECTRIC INDUSTRIAL Co., Ltd.) subjected to an anti-reflection treatment and a non-glare treatment were stuck onto opposite surfaces of the liquid-crystal cell. Thus, a normally white liquid-crystal display panel was obtained. The size of the panel was 45 mm wide and 34 mm long. One side surface of the back-side substrate in the direction of the length of the panel was protruded outward by 2 mm from that of the visual-side substrate. Then, a cold-cathode tube was disposed on the protruded side surface of the back-side substrate and surrounded by a silver-vapor-deposited polyester film. End portions of the film were bonded to upper and lower surfaces of the substrates by a double-side adhesive tape so that the cold-cathode tube was held and fixed.

REFERENCE EXAMPLE 2

A normally white liquid-crystal display panel provided with a cold-cathode tube held on one of side surfaces of the panel was obtained in the same manner as in Reference Example 1 except that the thickness of the low-refractive-index transparent layer made of magnesium fluoride was changed to 300 nm.

REFERENCE EXAMPLE 3

A normally white liquid-crystal display panel provided with a cold-cathode tube held on one of side surfaces of the panel was obtained in the same manner as in Reference Example 1 except that the thickness of the low-refractive-index transparent layer made of magnesium fluoride was changed to 100 nm.

REFERENCE EXAMPLE 4

A normally white liquid-crystal display panel provided with a cold-cathode tube held on one of side surfaces of the panel was obtained in the same manner as in Reference Example 1 except that the low-refractive-index transparent layer made of magnesium fluoride was not provided on the back-side substrate.

REFERENCE EXAMPLE 5

A normally white liquid-crystal display panel provided with cold-cathode tubes held on two of side surfaces of the panel was obtained in the same manner as in Reference Example 1 except that the size of the panel was changed to a size of 45 mm wide and 36 mm long so that opposite side surfaces of the back-side substrate in the lengthwise direction were protruded outward by 2 mm from those of the visual-side substrate respectively.

REFERENCE EXAMPLE 6

A normally white liquid-crystal display panel provided with cold-cathode tubes held on two of side surfaces of the panel was obtained in the same manner as in Reference Example 5 except that the low-refractive-index transparent layer made of magnesium fluoride was not provided on the back-side substrate.

REFERENCE EXAMPLE 7

An acrylic ultraviolet-curable resin (ARONIX UV-3701 made by TOAGOSEI CHEMICAL INDUSTRY Co., Ltd.)

was dropped by a dropper so that a mold processed into a predetermined shape in advance was filled with the acrylic ultraviolet-curable resin. A triacetylcellulose (TAC) film (having a saponified surface and a refractive index of 1.49) having a thickness of 80 μm was quietly set on the acrylic ultraviolet-curable resin and then adhered closely thereto by a rubber roller so that a surplus of the resin and air bubbles were removed. Then, the acrylic ultraviolet-curable resin was irradiated with ultraviolet rays by a metal halide lamp so that the resin was cured. Then, the resin was peeled off from the mold and cut into a predetermined size. Thus, a transparent sheet having an optical path control layer having a refractive index of 1.51 was obtained. An adhesive layer having a refractive index of 1.47 was attached to a surface of the transparent sheet where the optical path control layer was not provided.

Incidentally, the transparent sheet was 40 mm wide and 30 mm long. The transparent sheet had prism-like concave portions disposed continuously at intervals of a pitch of 210 μm and having ridgelines inclined at an angle of 21 degrees in the widthwise direction (FIG. 3C). Each of the prism-like concave portions had an optical path changing slope A1 and a gentle slope A2. The inclination angle of each of the optical path changing slopes A1 was 42 degrees. The inclination angle of each of the gentle slopes A2 varied in a range of from 2.5 to 3.5 degrees. The difference between the inclination angles of adjacent ones of the gentle slopes A2 was not larger than 0.1 degree. The projected width of each of the optical path changing slopes A1 on a reference plane was in a range of from 12 to 16 μm. The ratio of the projected area of the gentle slopes A2 on the reference plane to the projected area of the optical path changing slopes A1 on the reference plane was not smaller than 12.

REFERENCE EXAMPLE 8

An optical path control layer having a refractive index of 1.51 was formed in the same manner as in Reference Example 7 except that the TAC film was replaced by a polycarbonate film having a thickness of 60 μm. The optical path control layer was peeled off from the polycarbonate film. Thus, a transparent sheet serving as the optical path control layer itself was obtained. An adhesive layer having a refractive index of 1.51 was attached to a surface of the transparent sheet where the optical path control layer was not provided. Incidentally, the transparent sheet was 40 mm wide and 30 mm long. The transparent sheet had prism-like concave portions disposed continuously at intervals of a pitch of 210 μm and having ridgelines inclined at an angle of 21 degrees in the widthwise direction (FIG. 3B). Each of the prism-like concave portions had an optical path changing slope A1 and a steep slope A2. The inclination angle of each of the optical path changing slopes A1 was 42 degrees. The vertex angle between the optical path changing slope A1 and the steep slope A2 was 70 degrees. The projected width of each of the optical path changing slopes A1 on a reference plane was in a range of from 12 to 16 μm. The projected area of the flat portions A3 on the reference surface was not smaller than 10 times as large as the total projected area of the optical path changing slopes A1 and the steep slopes A2 on the reference plane.

REFERENCE EXAMPLE 9

An adhesive layer-including transparent sheet serving as an optical path control layer itself was obtained in the same manner as in Reference Example 8 except that another mold was used. The transparent sheet had a plurality of optical path changing means (FIG. 3B) each having a length of 80 μm. Each of the plurality of optical path changing means has an optical path changing slope A1 and a steep slope A2. The inclination angle of each of the optical path changing slopes A1 was about 42 degrees. The projected width of each of the optical path changing slopes A1 on a reference plane was 10 μm. The inclination angle of each of the steep slopes A2 was about 65 degrees. The lengthwise direction of the plurality of optical path changing means was parallel to an incidence side surface. The optical path changing means were disposed so that they became gradually dense as they went farther from the incidence side surface in the widthwise direction (FIGS. 6 and 8). The projected area of the flat portions A3 on the reference surface was not smaller than 10 times as large as the total projected area of the optical path changing slopes A1 and the steep slopes A2 on the reference plane.

REFERENCE EXAMPLE 10

An adhesive layer-including transparent sheet serving as an optical path control layer itself was obtained in the same manner as in Reference Example 9 except that a further mold was used. The transparent sheet had a plurality of optical path changing means (FIG. 3A) having a length of 80 μm. Each of the optical path changing means was shaped like an isosceles triangle having optical path changing slopes A1 as its equalateral sides. The inclination angle of each of the optical path changing slopes A1 was about 42 degrees. The projected width of each of the optical path changing slopes A1 on a reference plane was 10 μm. The lengthwise direction of the optical path changing means was parallel to an incidence side surface. The optical path changing means were disposed at random so that they became gradually dense as they went from the incidence side surface toward the center portion of the transparent sheet in the widthwise direction (FIG. 6). The projected area of the flat portions A3 on the reference surface was not smaller than 10 times as large as the total projected area of the optical path changing slopes A1 on the reference plane.

REFERENCE EXAMPLE 11

An adhesive layer-including transparent sheet serving as an optical path control layer itself was obtained in the same manner as in Reference Example 8 except that the surface of the mold was roughened by sandblasting.

REFERENCE EXAMPLE 12

An adhesive layer-including transparent sheet serving as an optical path control layer itself was obtained in the same manner as in Reference Example 8 except that a further mold was used. The transparent sheet had prism-like concave portions disposed continuously at intervals of a pitch of 210 μm (FIG. 3B). Each of the prism-like concave portions is constituted by an optical path changing slope A1 and a steep slope A2. The inclination angle of the optical path changing slopes A1 was 30 degrees. The vertex angle between the optical path changing slope A1 and the steep slope A2 was 70 degrees. The projected width of each of the optical path changing slopes A1 on a reference plane was in a range of from 10 to 16 μm. The projected area of the flat portions A3 on the reference plane was not smaller than 10 times as large as the total projected area of the optical path changing slopes A1 and the steep slopes A2 on the reference plane.

EXAMPLE 1

A transparent sheet obtained in Reference Example 7 was bonded to a back-side surface of a liquid-crystal display panel obtained in Reference Example 1 through the adhesive layer of the transparent sheet. Thus, a transmission type liquid-crystal display device was obtained.

Comparative Example 1

A transparent sheet obtained in Reference Example 7 was bonded to a back-side surface of a liquid-crystal display panel obtained in Reference Example 4 through the adhesive layer of the transparent sheet. Thus, a transmission type liquid-crystal display device was obtained.

EXAMPLE 2

A transparent sheet obtained in Reference Example 8 was bonded to a back-side surface of a liquid-crystal display panel obtained in Reference Example 1 through the adhesive layer of the transparent sheet. Thus, a transmission type liquid-crystal display device was obtained.

EXAMPLE 3

A transparent sheet obtained in Reference Example 8 was bonded to a back-side surface of a liquid-crystal display panel obtained in Reference Example 2 through the adhesive layer of the transparent sheet. Thus, a transmission type liquid-crystal display device was obtained.

EXAMPLE 4

A transparent sheet obtained in Reference Example 8 was bonded to a back-side surface of a liquid-crystal display panel obtained in Reference Example 3 through the adhesive layer of the transparent sheet. Thus, a transmission type liquid-crystal display device was obtained.

Comparative Example 2

A transparent sheet obtained in Reference Example 8 was bonded to a back-side surface of a liquid-crystal display panel obtained in Reference Example 4 through the adhesive layer of the transparent sheet. Thus, a transmission type liquid-crystal display device was obtained.

Comparative Example 3

A transparent sheet obtained in Reference Example 11 was bonded to a back-side surface of a liquid-crystal display panel obtained in Reference Example 1 through the adhesive layer of the transparent sheet. Thus, a transmission type liquid-crystal display device was obtained

Comparative Example 4

A transparent sheet obtained in Reference Example 12 was bonded to a back-side surface of a liquid-crystal display panel obtained in Reference Example 1 through the adhesive layer of the transparent sheet. Thus, a transmission type liquid-crystal display device was obtained.

EXAMPLE 5

A transparent sheet obtained in Reference Example 9 was bonded to a back-side surface of a liquid-crystal display panel obtained in Reference Example 1 through the adhesive layer of the transparent sheet. Thus, a transmission type liquid-crystal display device was obtained.

Comparative Example 5

A transparent sheet obtained in Reference Example 9 was bonded to a back-side surface of a liquid-crystal display panel obtained in Reference Example 4 through the adhesive layer of the transparent sheet. Thus, a transmission type liquid-crystal display device was obtained.

EXAMPLE 6

A transparent sheet obtained in Reference Example 10 was bonded to a back-side surface of a liquid-crystal display panel obtained in Reference Example 5 through the adhesive layer of the transparent sheet. Thus, a transmission type liquid-crystal display device was obtained.

Comparative Example 6

A transparent sheet obtained in Reference Example 10 was bonded to a back-side surface of a liquid-crystal display panel obtained in Reference Example 6 through the adhesive layer of the transparent sheet. Thus, a transmission type liquid-crystal display device was obtained.

EXAMPLE 7

An aluminum thin film was applied onto a roughened surface of a polyester film by vacuum vapor deposition. An adhesive layer having a refractive index of 1.46 was provided thereon to obtain a reflection sheet. The reflection sheet was bonded to a back-side surface of an optical path control layer in a liquid-crystal display device obtained in Example 5 through the adhesive layer of the reflection sheet. Thus, a transmission-reflection double type liquid-crystal display device was obtained.

Comparative Example 7

A transmission-reflection double type liquid-crystal display device was obtained in the same manner as in Example 7 except that the liquid-crystal display device was replaced by a liquid-crystal display device obtained in Comparative Example 5.

Evaluation Test

Frontal luminance in a position distanced by 5 mm from the incidence side surface, in the center portion and in a position distanced by 5 mm from the opposite side surface of the liquid-crystal display device obtained in each of Examples 1 to 7 and Comparative Examples 1 to 7 was measured in a dark room by a luminance meter (BM-7 made by TOPCON Corp.) while the cold-cathode tube was switched on in the condition that the liquid-crystal cell was supplied with no voltage. Further, display in an illumination mode was observed in a frontal direction, in a direction of 15 degrees from the incidence side surface side and in a direction of 15 degrees from the opposite side surface side. On this condition, display quality was evaluated. The case where the display device was bright and excellent in uniformity of brightness so that light was made to exit efficiently was evaluated as o. The case where the display device was slightly inferior in brightness and uniformity of brightness was evaluated as Δ. The case where the display device was dark and uneven in brightness was evaluated as X.

Results of the measurement were shown in the following table.

| | Frontal Luminance (cd/m²) | | |
|---|---|---|---|
| | Incidence Side Surface Portion | Center Portion | Opposite Side Surface Portion |
| Example 1 | 134 | 126 | 116 |
| Comparative Example 1 | 108 | 52 | 24 |
| Example 2 | 146 | 136 | 136 |
| Example 3 | 138 | 123 | 116 |
| Example 4 | 124 | 108 | 98 |
| Comparative Example 2 | 105 | 48 | 25 |
| Comparative Example 3 | 29 | 21 | 26 |
| Comparative Example 4 | 40 | 28 | 32 |
| Example 5 | 132 | 138 | 134 |
| Comparative Example 5 | 111 | 50 | 34 |
| Example 6 | 228 | 251 | 234 |
| Comparative Example 6 | 131 | 75 | 139 |
| Example 7 | 128 | 111 | 104 |
| Comparative Example 7 | 109 | 45 | 28 |

| | Display Quality | | |
|---|---|---|---|
| | Incidence Side Surface Side | Frontal Direction | Opposite Side Surface Side |
| Example 1 | ○ | ○ | Δ |
| Comparative Example 1 | X | X | X |
| Example 2 | ○ | ○ | ○ |
| Example 3 | Δ | ○ | ○ |
| Example 4 | Δ | Δ | Δ |
| Comparative Example 2 | X | X | X |
| Comparative Example 3 | X | X | X |
| Comparative Example 4 | X | X | Δ |
| Example 5 | ○ | ○ | ○ |
| Comparative Example 5 | X | X | X |
| Example 6 | ○ | ○ | ○ |
| Comparative Example 6 | X | Δ | X |
| Example 7 | ○ | ○ | ○ |
| Comparative Example 7 | X | X | X |

It is apparent from the table that bright and uniform display in an illumination mode was achieved in Examples whereas vary dark or uneven display occurred in Comparative Examples. Further, it is apparent from Examples 2, 3 and 4 that characteristic in the incidence side surface portion was improved and uniformity of brightness increased as the thickness of the low-refractive-index transparent layer increased. In Comparative Examples 1, 2, 5 and 6 in which no low-refractive-index transparent layer was provided in the display device, however, the display device became dark suddenly as the viewing point went farther from the incidence side surface. It is found that the display device was large in unevenness of brightness regarded as being caused by absorption of the light in the color filter layer. As a result, in Comparative Examples 1, 2, 5 and 6, display was vary hard to view. According to the table, luminance seemed to be uniform in Comparative Example 6. However, when the viewing angle in the direction of the incidence side surface was changed, uniformity of luminance varied largely. As a result, in Comparative Example 6, display was very unnatural and hard to view. Luminance itself in Comparative Example 6 was also inferior to that in Example 6.

Further, in Comparative Example 3 in which the surface of the transparent sheet was roughened and in Comparative Example 4 in which the inclination angle of the prism slopes was small, display was dark because light was not made to exit effectively. The liquid-crystal display device obtained in each of Examples 1 to 7 was observed in the condition that the device was supplied with a voltage to perform display. As a result, in each of Examples 1 to 7, good display was obtained in an illumination mode without any special problem. On the contrary, in Comparative Examples 1 to 7, display was hard to view. Particularly in Comparative Examples 1, 2 and 6, the portion of display threw its shadow over the other portions, so that it is very hard to view the display. In addition, in Example 7, good display was obtained without any special problem both in an illumination mode and in a reflection mode using external light. In Comparative Example 7, there was no problem in an external light mode but display was too dark and brightness was too uneven to view in an illumination mode.

It is to be understood from the above description that a transmission type or transmission-reflection double type liquid-crystal display device uniform in luminance distribution can be formed according to the present invention because the provision of a low-refractive-index transparent layer prevents light from being absorbed in a color filter, or the like, and it is to be also understood that a liquid-crystal display device good in display quality can be formed according to the present invention because reduction in thickness and weight is achieved by use of an optical path control layer system while increase in volume and weight caused by a light pipe is avoided.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A liquid-crystal display device comprising:
    a transmission type liquid-crystal display panel including a liquid-crystal cell, said liquid-crystal cell including a back-side substrate, a visual-side substrate, and a liquid crystal, said back-side substrate including a back-side transparent substrate, a low-refractive-index transparent layer which is lower in refractive index than the back-side transparent substrate, and a back-side transparent electrode, said visual-side substrate including a visual-side transparent substrate, and a visual-side transparent electrode, said liquid crystal being held between said back-side and visual-side substrates so that respective electrode sides of said back-side and visual-side substrates are disposed opposite to each other;
    at least one light source disposed on a side surface of said back-side transparent substrate; and
    an optical path control layer having a repetitive structure of optical path changing slopes disposed on a back side surface of said back-side substrate and being higher in refractive index than said low-refractive-index transparent layer, each of said optical path changing slopes being inclined at an inclination angle with respect to a reference plane of said back-side substrate, wherein said low-refractive-index transparent layer is disposed on a visual side of said back-side transparent substrate between said back-side transparent substrate and said back-side transparent electrode.

2. A liquid-crystal display device according to claim 1, wherein said low-refractive-index transparent layer and said back-side transparent substrate have a difference in refractive index of at least 0.05.

3. A liquid-crystal display device according to claim 1, wherein at least said back-side substrate in said liquid-crystal cell is made of an optically isotropic material.

4. A liquid-crystal display device according to claim 1, wherein said liquid-crystal display panel further includes one or two polarizers disposed on one of or both of opposite sides of said liquid-crystal cell.

5. A liquid-crystal display device according to claim 4, wherein said liquid-crystal display panel further includes at least one layer of phase retarder disposed between said liquid-crystal cell and said polarizer.

6. A liquid-crystal display device according to claim 1, wherein said optical path control layer is constituted by repetitive prismatic structures having said optical path changing slopes each facing said light source.

7. A liquid-crystal display device according to claim 6, wherein each of said prismatic structures in said optical path control layer is constituted by a concave portion shaped substantially like a triangle in a cross section of said optical path control layer.

8. A liquid-crystal display device according to claim 7, wherein each of said prism-like concave portions is constituted by a continuous groove which extends from one end to the other end of said optical path control layer in a ridgeline direction parallel with or inclined to said side surface of said back-side transparent substrate on which said light source is disposed.

9. A liquid-crystal display device according to claim 7, wherein said prism-like concave portions are constituted by discontinuous grooves each having a length not smaller than 5 times as long as a depth of said groove.

10. A liquid-crystal display device according to claim 9, wherein the length of each of said discontinuous grooves in said prism-like concave portions is approximately parallel with or inclined to said side surface of said back-side transparent substrate on which said light source is disposed.

11. A liquid-crystal display device according to claim 7, wherein said prism-like concave portions are constituted by discontinuous grooves disposed at random.

12. A liquid-crystal display device according to claim 6, wherein each of said prismatic structures in said optical path control layer is constituted by a concave or convex portion shaped, in section, substantially like a triangle or quadrangle having at least two optical path changing slopes facing said light source.

13. A liquid-crystal display device according to claim 12, wherein two light sources are disposed on at least two of side surfaces of said back-side transparent substrate.

14. A liquid-crystal display device according to claim 1, wherein said inclination angle of each of said optical path changing slopes in said optical path control layer is in a range of from 35 to 48 degrees.

15. A liquid-crystal display device according to claim 1, wherein said optical path control layer is made of a transparent sheet, and is bonded to said liquid-crystal display panel through an adhesive layer having a refractive index higher than that of said low-refractive-index transparent layer.

16. A liquid-crystal display device according to claim 15, wherein said adhesive layer is constituted by an adhesive agent.

17. A liquid-crystal display device according to claim 15, wherein each of the refractive index of said optical path control layer and the refractive index of said adhesive layer is higher by at least 0.05 than that of said low-refractive-index transparent layer.

18. A liquid-crystal display device according to claim 1, wherein said side surface of said back-side transparent substrate is protruded outward from that of said visual-side substrate; and said light source is disposed on said protruded side surface of said back-side transparent substrate.

19. A liquid-crystal display device according to claim 1, wherein said light source is disposed and held on said side surface of said back-side substrate in such a manner that said light source is surrounded by a reflection type light source holder and bonded to end portions of upper and lower surfaces of said back-side substrate through end portions of said light source holder.

20. A liquid-crystal display device according to claim 1, further comprising a reflector disposed on an outer side of said optical path control layer in order to reflect light coming from the liquid-crystal cell side.

21. A liquid-crystal display device according to claim 20, wherein said reflector is made of a metal thin film.

22. A liquid-crystal display device according to claim 20, wherein said reflector is made of a metal thin film attached to a support base material and is bonded to said optical path control layer through an adhesive layer having a refractive index lower than that of said optical path control layer and than that of said back-side transparent substrate.

* * * * *